UNITED STATES PATENT OFFICE.

MORITZ ULRICH, OF ELBERFELD, GERMANY, ASSIGNOR TO THE FARBEN-FABRIKEN, VORMALS FR. BAYER & CO., OF SAME PLACE.

BLACK AZO DYE.

SPECIFICATION forming part of Letters Patent No. 466,202, dated December 29, 1891.

Application filed July 11, 1891. Serial No. 399,243. (Specimens.)

*To all whom it may concern:*

Be it known that I, MORITZ ULRICH, doctor of philosophy, a subject of the Emperor of Germany, residing at Elberfeld, Prussia, Germany, (assignor to the FARBENFABRIKEN, VORMALS FR. BAYER & CO., of Elberfeld,) have invented a new and useful Improvement in the Manufacture of a New Black Azo Coloring-Matter, of which I give in the following a clear and exact description.

My invention relates to the production of a new valuable black azo coloring-matter by combining the diazo compound of sulfanilic acid with alpha-naphthylamine, by further diazotizing the amidoazo product thus obtained, and by allowing this diazo derivative to act upon the sodium salt of the dihydroxynaphthaline monosulphonic acid S of my Letters Patent, No. 444,679, dated January 13, 1891.

In carrying out my process practically I proceed as follows: 19.5 parts, by weight, of the sodium salt of sulfanilic acid are dissolved in five hundred liters of water, and after adding twenty-five parts, by weight, of hydrochloric acid, diazotized by seven parts, by weight, of sodium nitrite. This diazo solution is thereupon mixed with a watery solution of nineteen parts, by weight, of alpha-naphthylamine hydrochlorate. The naphthylamine-azobenzine sulpho-acid, the formation of which is almost instantly to be completed by the addition of sodium acetate, is filtered off, and redissolved in water by the addition of four parts, by weight, of soda. After fourteen parts, by weight, of sodium nitrite have been added to this solution the whole liquid is mixed on cooling with twenty-five parts, by weight, of hydrochloric acid. Out of this acid solution the free amido-naphtha-line-azobenzine sulpho-acid is separated at first as a violet precipitate, and the latter is slowly changed by the excess of sodium nitrite into the yellow diazo derivative of naphthaline-azobenzine sulpho-acid. After having been filtered off and washed with water this diazo product is directly introduced into the watery solution of twenty-seven parts, by weight, of the sodium salt of the dihydroxy-naphthaline monosulpho-acid S and of sodium acetate in excess. After standing for some time the new coloring-matter is treated with soda to form the sodium salt and separated by means of common salt. It is filtered off and dried.

My new coloring-matter, which has, according to its production, the formula:

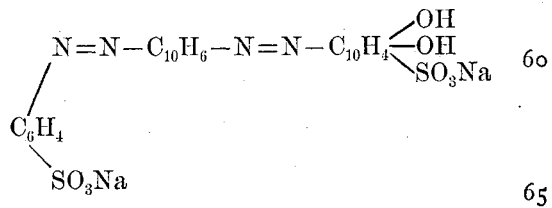

forms in dried state a greenish-black powder with metallic luster. It is only slightly soluble in cold water, readily in hot water with deep-violet color, and likewise in hot solution of sodium carbonate with the same color. It is dissolved by hot soda-lye and by ammonia solution with intensely-blue color. In concentrated sulphruric acid it dissolves with deep-green color, and the sulphuric-acid solution thus obtained by slowly adding cold water changes its color from green to greenish-blue, blue, blue violet, and at last violet flakes being separated, while the supernatant fluid becomes perfectly colorless. It dyes unmordanted wool in weakly-acid baths in shades bluish-black to black, fast against light, soap, and milling, and forms with chromium salts chromium lakes.

Having thus described my invention, what I claim as new, and desire to secure by Letters Patent, is—

As a new product, the coloring-matter which has the formula

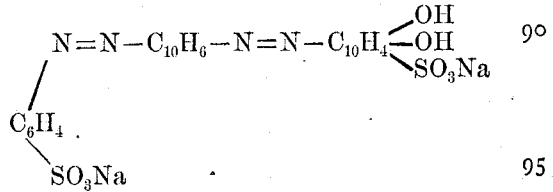

and possesses the following properties: it is slightly soluble in cold water, readily in hot water with deep-violet color, likewise in hot solutions of sodium carbonate with the same color; by hot soda-lye and by ammonia it is dissolved with intensely-blue color; in concentrated sulphuric acid it dissolves with deep green color, which solution by slow addition of cold water gradually changes its color from green to greenish-blue, blue, blue violet, and at last violet flakes being separated, while the supernatant fluid becomes perfectly colorless.

In testimony whereof I have signed my name in presence of two subscribing witnesses.

MORITZ ULRICH.

Witnesses:
WM. ESSENWEIN,
RUDOLPH FRICKE.